Jan. 24, 1967  C. U. BALLARD  3,299,637
FLUID SYSTEM VENTING AND FILLING
Original Filed Nov. 26, 1962  3 Sheets-Sheet 1

CHARLES U. BALLARD
INVENTOR.

BY *Hazard & Miller*

ATTORNEYS.

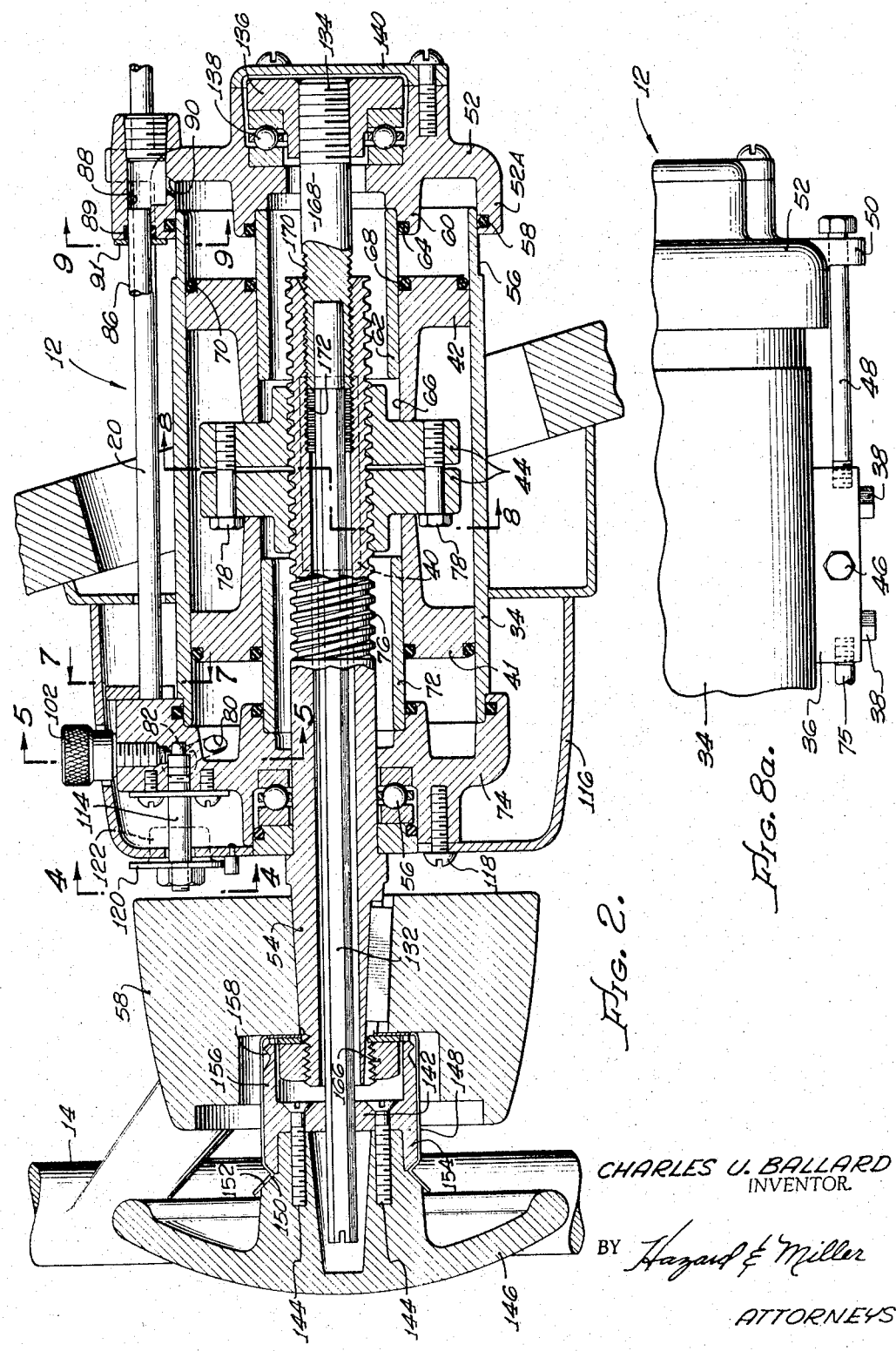

Jan. 24, 1967　　　C. U. BALLARD　　　3,299,637
FLUID SYSTEM VENTING AND FILLING
Original Filed Nov. 26, 1962　　　3 Sheets-Sheet 3
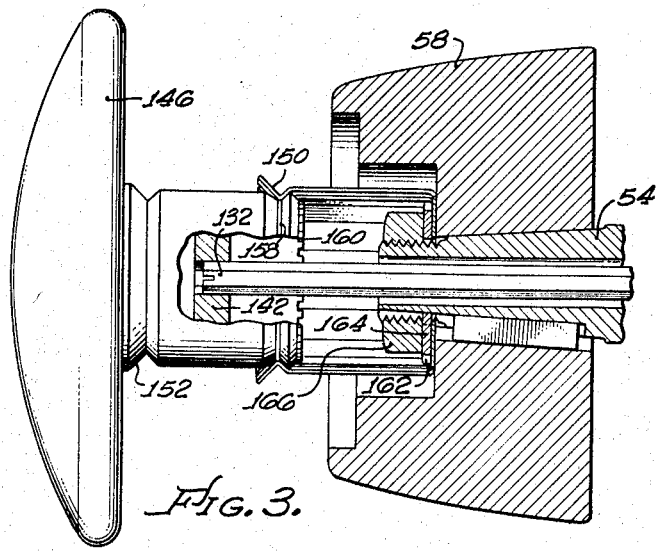
Fig. 3.
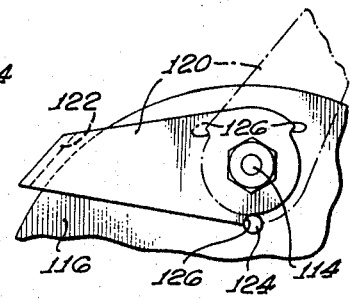
Fig. 4.
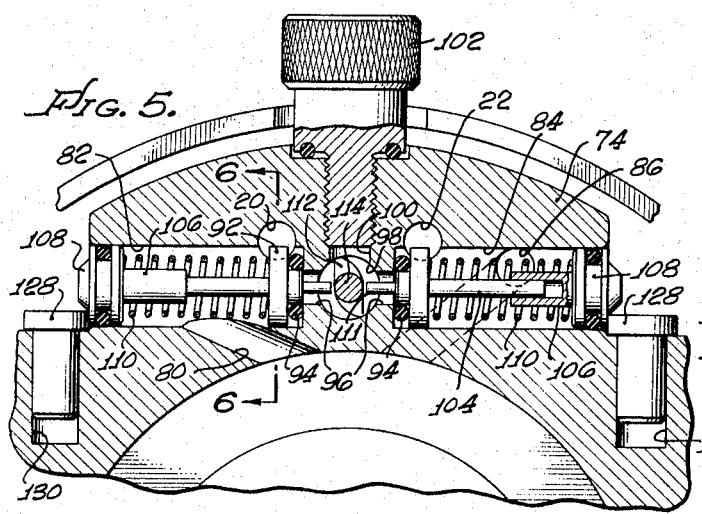
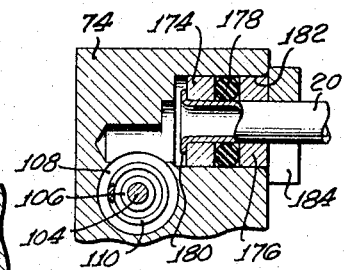
Fig. 6.
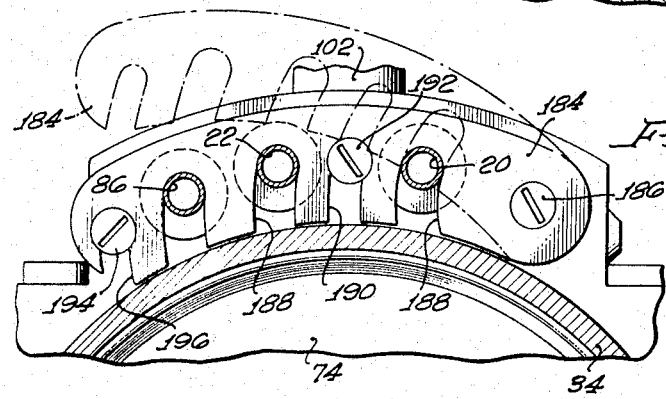
Fig. 7.
CHARLES U. BALLARD
INVENTOR.
BY *Hazard & Miller*
ATTORNEYS.

United States Patent Office 3,299,637
Patented Jan. 24, 1967

3,299,637
FLUID SYSTEM VENTING AND FILLING
Charles U. Ballard, 4253 W. Lennox,
Inglewood, Calif. 90304
Original application Nov. 26, 1962, Ser. No. 240,033, now Patent No. 3,258,923, dated July 5, 1966. Divided and this application Apr. 8, 1966, Ser. No. 541,377
3 Claims. (Cl. 60—54.5)

This application is a division of application, Serial No. 240,033, filed November 26, 1962, entitled "Hydraulic Power Transmission," now Patent No. 3,258,923.

This invention relates to a hydraulic power transmission system and more particularly to one wherein there is a master unit and a slave unit, the latter being controlled by actuation of the master unit. The invention is adaptable for many uses, one of which is a remote steering control for boats with outboard motors.

One of the objects of the invention is to provide a hydraulic transmission unit wherein, when the system is not in operation, the operator can quickly and easily make an adjustment which will relieve the system of internal pressures and which also allows for the expansion of hydraulic fluids in the system which may occur when the device is not operating but is subjected to the heat of the sun. By relieving the internal pressures, the system is far less subject to leakage and damaging pressures on the working parts.

Another object of the invention is to provide means whereby the hydraulic system can readily be bled of air and wherein checking and filling the system with fluid can be accomplished quickly and conveniently.

Still another object of the invention is to provide improved means for anchoring tubing or similar conduits with anchoring means which is simple in construction and which permits tubing to be connected and disconnected with great rapidity. It requires no special tools and flaring of the tubing is not required. Furthermore, it is a tube anchor which can be utilized to great advantage in confined spaces.

The above and other objects of the invention will more fully appear from the following description in connection with the accompanying drawings, in which:

FIG. 2 is a longitudinal vertical sectional view on an enlarged scale through the master control unit.

FIG. 3 is a fragmentary view partially in section of the control wheel shown in FIG. 2 in an alternate position thereof;

FIG. 4 is a fragmentary detail taken approximately on the line 4—4 of FIG. 2;

FIG. 5 is an enlarged fragmentary detail partially in section taken approximately on the line 5—5 of FIG. 2;

FIG. 6 is a slightly enlarged sectional detail taken approximately on the line 6—6 of FIG. 5;

FIG. 7 is an enlarged detail taken approximately on the line 7—7 of FIG. 2;

FIG. 8a is a plan view of a portion of the master unit showing the mounting and connector blocks and connector bolts;

Figure 1:
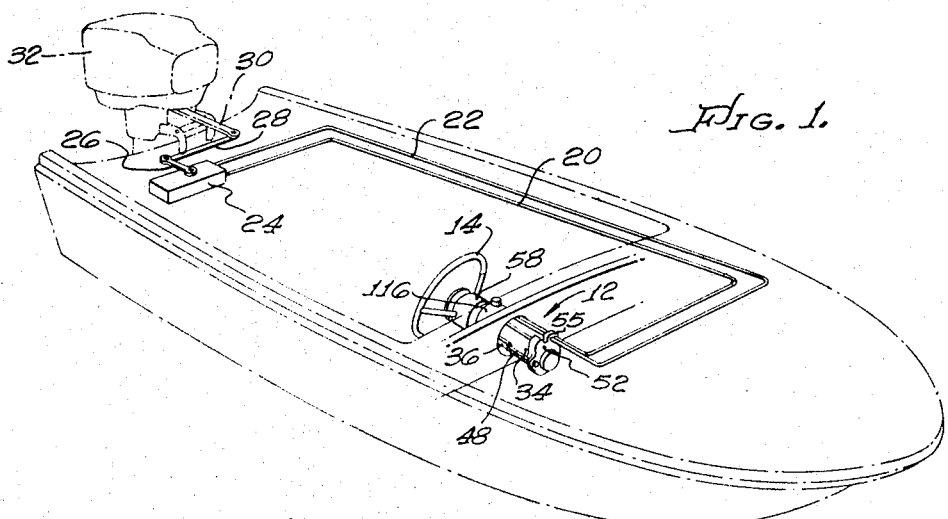
FIG. 1 is a perspective view of an embodiment of the invention as applied to an outboard motor, an outboard motor and boat being shown in broken lines.
Figures 9, 10:
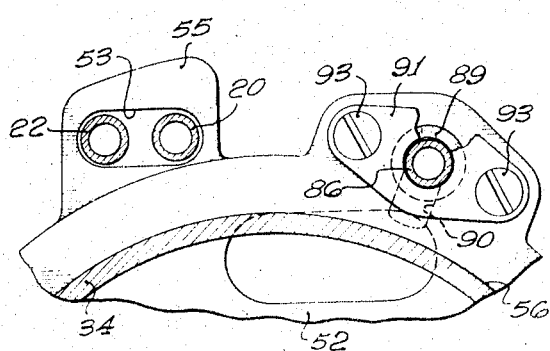
FIG. 9 is an enlarged sectional detail taken approximately on the line 9—9 of FIG. 2.
FIG. 10 is a diagrammatic layout of the master unit, the slave unit and the filler and bleeder valves shown in FIG. 5.

In FIGS. 1 and 10 are indicated a master unit 12 including a hand wheel 14 which as shown in FIG. 10 is mounted on a screw 16 carrying a piston assembly 18 which when moved will cause pressure flow in lines 20 and 22 which are connected to a slave unit 24. In FIG. 1 the slave unit is connected by links 26 and 28 to the steering handle 30 of a device to be controlled, such as the outboard motor 32.

Figure 8:
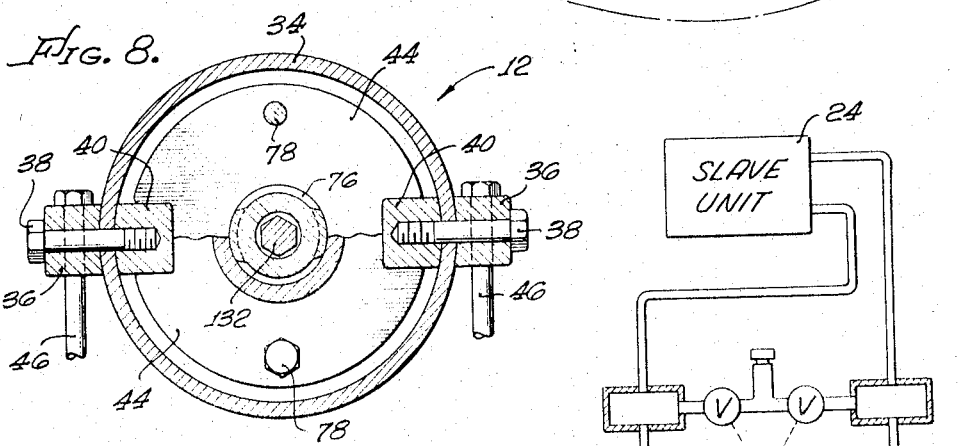
FIG. 8 is a sectional view taken approximately on the line 8—8 of FIG. 2.

The master control unit 12 has some features of construction which are disclosed in my prior Patents Nos. 2,192,175; 2,287,960; 2,360,539; 2,546,055; 2,693,811; and 2,705,969. However, it will be seen that I have produced some considerable improvements over the construction disclosed in my prior patents. As shown in FIGS. 1, 8 and 8a, the master control unit 12 includes a cylinder 34 to the outer sides of which are secured blocks 36 by means of bolts 38 which extend through the walls of the cylinder 34 and are threaded into keyway blocks 40 which serve as guides for a piston unit including a pair of opposed piston heads 41, 42 and an intermediate internally threaded hub unit 44. The blocks 36 on the outer sides of the cylinder 34 are provided with vertically disposed bolts 46 by means of which the master unit is anchored to a suitable portion of the boat, shown in FIG. 1. Also extending rearwardly from each of the blocks 36 is a bolt 48 which extends slidably through apertured lugs 50 on a cylinder end cap 52 which is axially movable relative to the remainder of the cylinder in a manner and for a purpose to be described below.

The piston hub unit 44 is shown threaded upon a rotary spindle 54 which is generally in the left end of the cylinder as viewed in FIG. 2, on a suitable bearing assembly 56. Upon the left end of the spnidle 54 is a hub 58 of the steering wheel 14, shown also in FIG. 1. Rotation of the wheel 14 and the threaded spindle 54 will cause the piston units 41, 42 to move axially of the cylinder 34, thus creating a pressure flow of fluid in one direction or the other against suitable responsive elements in the slave unit 24 to actuate the linkage 26, 28 and the steering arm 30 of the outboard motor 32.

With ordinary units of this general type, when used in a boat for example, when the operator leaves the boat and the hydraulic system is not being actuated, the heat of the sun is sufficient to cause an expansion of the power transmitting fluid, usually liquid, and extremely high and damaging pressures result. This prdouces leakage and strain on the various parts of the system. Even though the boat or other apparatus in which the system is used may not be exposed to the sun, the system would normally remain under considerable pressure, which it is highly advantageous to relieve when the system is not in operation. Lost motion or play can be varied or adjusted. Likewise the bite or friction between the threaded hub units 44 and the threaded spindle can be varied by movement of the right cylinder head 52 to vary the fluid pressure on the working faces of the piston heads 41 and 42.

Pressure is relieved in the system merely by making an adjustment which will move the right cylinder head 52 to the right, thereby enlarging the fluid capacity of the cylinder and reducing the pressure to any desired degree, even to the point where there is no pressure at all within the system. It will be seen that the right cylinder head 52 has a flange 52A slidable on a reduced annular surface 56 at the right end of the cylinder 34, proper seal being provided by an O-ring 58. The cylinder head 52 has an inwardly concentric flange 60 which has pressed therein a sleeve 62 sealed to the flange 60 by an O-ring 64. The sleeve 62 extends into a central bore 66 formed in the central portion of the right piston head unit 42, a sealed relationship being provided by an O-ring 68 in the right face of the piston member 42. The piston head 42 carriers an outer O-ring 70 which provides a seal between said piston head and the inner wall of the cylinder 34. Thus, the piston head 42 can move axially of the cylinder and relative to the sleeve 62 and the cylinder head 52, and said cylinder head 52 and sleeve 62 can move axially of the main cylinder body 34 and relative to the cylinder and the piston head 42.

The master unit cylinder 34 serves as a fluid reservoir since it contains fluid in excess of that required for the system. Therefore, in the event of a loss of fluid, the right cylinder head 52 can be moved to the left to take up the space created by the fluid loss and the system will remain operationally filled.

The left piston head unit 41 is movable within the cylinder 34 and on a sleeve 72 which is carried by a fixed cylinder head 74 at the left end of cylinder 34, as viewed in FIG. 2. Bolts 75, one of which is shown in FIG. 8a are connected between the blocks 36 and the fixed cylinder head 74 to secure the cylinder head on the end of the cylinder 34. The rotary spindle 54 is provided with external squared speed threads 76 upon which the threaded hubs 44 are carried. Rotation of the spindle 54 will cause the hubs 44 to travel longitudinally of the spindle. When the hubs 44 are moved to the right as viewed in FIG. 2, the piston head 42 will be pushed to the right creating a hydraulic pressure which, by reason of the system of FIG. 10 will exert a pressure on the face of the left piston head 41, also moving it to the right. Naturally when the threaded spindle 54 is rotated by the wheel 14 in the opposite direction, the hubs 44 and the piston heads 41 and 42 will be moved to the left. In FIG. 2 in broken lines, there is shown one of the keys 40 which also appear in FIG. 8 which serve as keys for the hub members 44 to prevent them from rotating when the spindle 54 is turned, thereby causing the hubs to move along the threads 76 on the spindle. Also shown in FIGS. 2 and 8 are bolts 78 which connect the two hub members 44 to provide a single operative hub unit.

When the piston heads 41 and 42 are moved to the left, piston head 41 will exert a pressure flow in the left end of the cylinder 34 and also through a conduit 80 in the left cylinder head 74. This conduit is in communication with a bore 82 in the cylinder head 74 and said bore in turn communicates with the flow line 20 shown in FIGS. 1 and 10 which leads to the slave unit 24.

A return line 22 extends from the slave unit 24, and as shown in FIG. 5, is in communication with a bore 84 in the left or stationary cylinder head 74, which bore is connected by a line 86 to a small chamber 88 in the opposite cylinder head 54, said chamber having a port 90 providing pressure flow communication to the interior of the cylinder 34 at the right side of the piston head 42.

Mounted in the bores 82 and 84 in the left cylinder head 74, are valve heads 92 having O-ring seals 94 which seal the valve heads about the ends of complementary ports 96 which are connected by an intermediate chamber 98 having an upwardly directed port 100 normally closed by removable threaded plug 102. Each of the valve heads 92 is provided with a stem 104 reciprocable in a sleeve-like guide 106 which is carried by a sealed closure 108 at the outer end of each bore 82 and 84. A compression spring 110 yieldably maintains the O-ring seals 94 in sealing engagement about the ends of the ports 96.

Projecting inwardly toward each other from each of the valve heads 92 is a stem 111 and each stem bears against the lobes of a rotatable cam element 112, including an operating shaft 114 shown also in FIG. 2 as extending through a cover housing 116 secured to the left cylinder head 74 by means of bolts 118. The cam operating shaft 114 has an actuating lever 120 shown in FIGS. 2 and 4. The lever 120 has a bent over end 122 which in the full line position of the lever in FIG. 4 will engage the housing 116 to limit rotational movement of the cam shaft 114 and the cam unit 112 to the position shown in FIG. 5 wherein the valves 92 are in a closed position or in a position sealing the ports 96. Movement of the lever 120 is also limited by a pin 124 extending from the housing 116 which in opposed positions of the lever 120 will engage one of a pair of rounded shoulders 126 formed on the inner end of the lever 120. When the lever 120 is in the broken line position of FIG. 4 the cams 112 will have been rotated to unseat the valves 92 and provide a flow communication between conduits 20 and 22. Furthermore, when the cam is in this position and the threaded plug 102 is removed from the filler port 100 the system can be bled of air which might for some reason have gotten into it and additional hydraulic fluid can be added through the filler port 100 and into the two lines 20 and 22 which lead from the master cylinder 34 to the slave unit 24. Preferably, a hand operated fluid pump with a threaded nipple replaces the plug 102. Such a pump can reciprocate to agitate the fluid in the system and suction applied to bleed off any air which might be present. Thereupon, fluid can be forced into the system to fill it.

When the system is filled the movable cylinder head 52 is not positioned to its extreme right as viewed in FIG. 2. This permits it to be shifted to the right later to allow for expansion of the fluid when it becomes heated.

Preferably, when the system is bled of air, the piston heads 41 and 42 are moved to the ends of cylinder 34 and as close to their respective ports 80 and 90 as possible to reduce to a minimum the space in which air might be present and facilitate its removal.

The plugs 108 which carry the valve stem guide sleeves 106 may be conveniently held in place by pins 128 which are removably received in upright bores 130 in the left cylinder head 74.

Extending through the spindle 54 is an adjustment shaft 132 which at its right end is provided with threads 134 by means of which it is secured in a nut 136 mounted in a ball bearing assembly 138, said bearing assembly being mounted within the right cylinder head 52 and concealed by a closure plate 140. The shaft 132 extends to the left beyond the spindle 54. The left portion of shaft 132 is conveniently of hexagonal shape and is slidable through a similarly apertured disc 142, said disc being secured by bolts 144 to the hub of a rounded knob 146. The knob 146 and disc 142 are held in the position of FIG. 2 by means of spring tongues 148 having V-shaped bends 150 receivable in an annular V-shaped notch 152 about the hub of the knob 146 and a left hand sleeve-like extension 154 of the disc 142. Said disc also has a rightward sleeve-like extension 156 with an annular V-shaped groove 158 which is adapted to receive the V-shaped bends 150 of the spring elements 148 when the knob 146 is pulled outwardly or to the left, as viewed in FIG. 3. In FIG. 3 the right end of the sleeve 156 is provided with serrations 160 which are adapted to fit complementary teeth or serrations 162 in a washer 164 which is held on the threaded shank 54 by means of a nut 166. Thus, when the knob 146 is pushed inwardly or to the right, the teeth or serrations 160 will fit the serrations 162 in the washer 164 so that the spindle 54 and shaft 132 are locked for rotation together. However, when the knob 146 is pulled outwardly as in FIG. 3, said knob and the spindle 54 are disengaged through separation of the teeth or serrations 160 and 162 and rotation of the knob 146 will rotate only the shaft 132 and its threaded extension 168. This extension with its threads 170 and the internal threads 172 in the spindle 54 will cause the shaft 132, 168 to move axially relative to spindle 54 and through the threaded connection with the nut 136, cause the right cylinder head 52 to move axially relative to the remainder of the cylinder, thus increasing or decreasing the volumetric capacity of the cylinder. When such capacity is increased it will reduce or completely relieve any liquid pressure within the system to prevent leakage of the hydraulic fluid. However, when the cylinder head 52 is pulled inwardly or to the left by rotation of the knob 146, the volumetric capacity of the system is reduced and pressure restored.

The conduit 86 shown partially in FIG. 2, and its extension into the left cylinder head 74 being shown in FIG. 5, provides a flow connection from the line 22 to the slave conduit, through the bore 84 and said conduit 86, to the end of the master cylinder 34. Inasmuch as the right cylinder head 52 is movable axially of the remainder of the cylinder, it is necessary that there be an expansible connection between the tube 86 and the said right cylinder head 52. This is shown in FIG. 2 where the tube 86 is extended into the bore 88 in the upper portion of the cylinder head 54, a sealing ring 89 being provided to permit a sliding seal about the tube 86. This seal is held in position as shown in FIG. 2 by means of a small apertured plate 91 secured to the cylinder head by means of bolts 93. Conduits 20 and 22 shown in FIG. 9 merely extend through an aperture 54 in a boss 55 extending from the right cylinder head 52, said boss merely serving to help maintain the position of and protect conduits 20 and 22.

In FIG. 6 there is shown a typical anchoring installation for the left ends of tubular conduits 20, 22 and 86. The particular conduit shown in FIG. 6 is the conduit 20 which is one of the two which leads to the slave unit 24. It will be noted that the left end of said conduit 20 extends through a pair of rings 174 and 176, between which are located an O-ring 178. The extreme left end of the conduit 20 is enlarged as at 180. The end of the conduit, rings 174 and 176 and O-ring 178 are inserted as a unit in a bore 182 in the left cylinder head 74. The other conduits 22 and 86 are likewise located in bores similar to the bore 182 and they are secured within the bores by a pivoted anchoring lever 184 shown in FIG. 7 to be secured to the cylinder head 74 by means of a pivot bolt 186. The anchoring lever has arcuate slots 188 which receive the several tubes 20 and 22 and 86 with the anchoring lever 184 as shown in FIG. 6 lying closely against a face of the cylinder head 74 to confine the ends of said tubes with the rings 174 and 176 and the sealing O-ring 178. Intermediate the ends of the lever 184 is a slot 190 to receive a stud 192 and a similar stud 194 is receivable in an arcuate slot 196 in the outer end of the anchoring lever 184. The studs 192 and 196 prevent the anchoring lever 184 from being sprung laterally away from the anchored ends of the tubes 20, 22 and 86.

This type of anchoring means for tubing is highly advantageous in constructions such as this where space is limited and it is impractical or awkward to attempt to use ordinary threaded couplings, yet the tubing is firmly anchored in a properly sealed condition.

It will be understood that various changes may be made in the details of the construction without departing from the spirit and scope of the invention as defined by the appended claims.

I claim:

1. In a fluid power transmission system, a cylinder having pressure flow conduit means communicating with opposite end portions thereof, a piston movable axially in said cylinder between said end portions, a servicing conduit flow connected to said system and having a normally closed exterior communication inlet, a pair of valves independently biased to seat toward each other in said servicing conduit at opposite sides of said exterior communication inlet, said valves, when open, providing an air venting and fluid filling passage between said exterior communication inlet and said system, and a common actuator disposed between said valves and engageable with the valves to open them simultaneously upon movement of said actuator.

2. The structure in claim 1, and said valves having portions located adjacent each other and movable away from each other to valve opening positions, and said common actuator being movable to shift said valve portions to said valve opening positions.

3. The structure in claim 1, and said actuator for said valves comprising a double-lobed cam member, one each of said lobes being engageable with a valve to actuate the same.

References Cited by the Examiner

UNITED STATES PATENTS

| 1,793,777 | 2/1931 | Condon | 137—609 X |
| 2,110,195 | 3/1938 | Boyle | 137—609 X |
| 2,238,374 | 4/1941 | Sallee | 137—609 X |
| 2,597,050 | 5/1952 | Audemar | 60—54.5 |
| 3,040,533 | 6/1962 | Heinrich | 60—54.5 |

FOREIGN PATENTS

| 1,101,826 | 4/1955 | France. |
| 1,192,434 | 4/1959 | France. |

OTHER REFERENCES

Bopp et al., German application 1,001,072, January 1957.

MARTIN P. SCHWADRON, *Primary Examiner.*

ROBERT R. BUNEVICH, *Examiner.*